Feb. 26, 1952     E. A. DAVIS ET AL     2,587,119
APPARATUS FOR VULCANIZING ANNULAR ARTICLES
Filed Aug. 6, 1946     2 SHEETS—SHEET 2
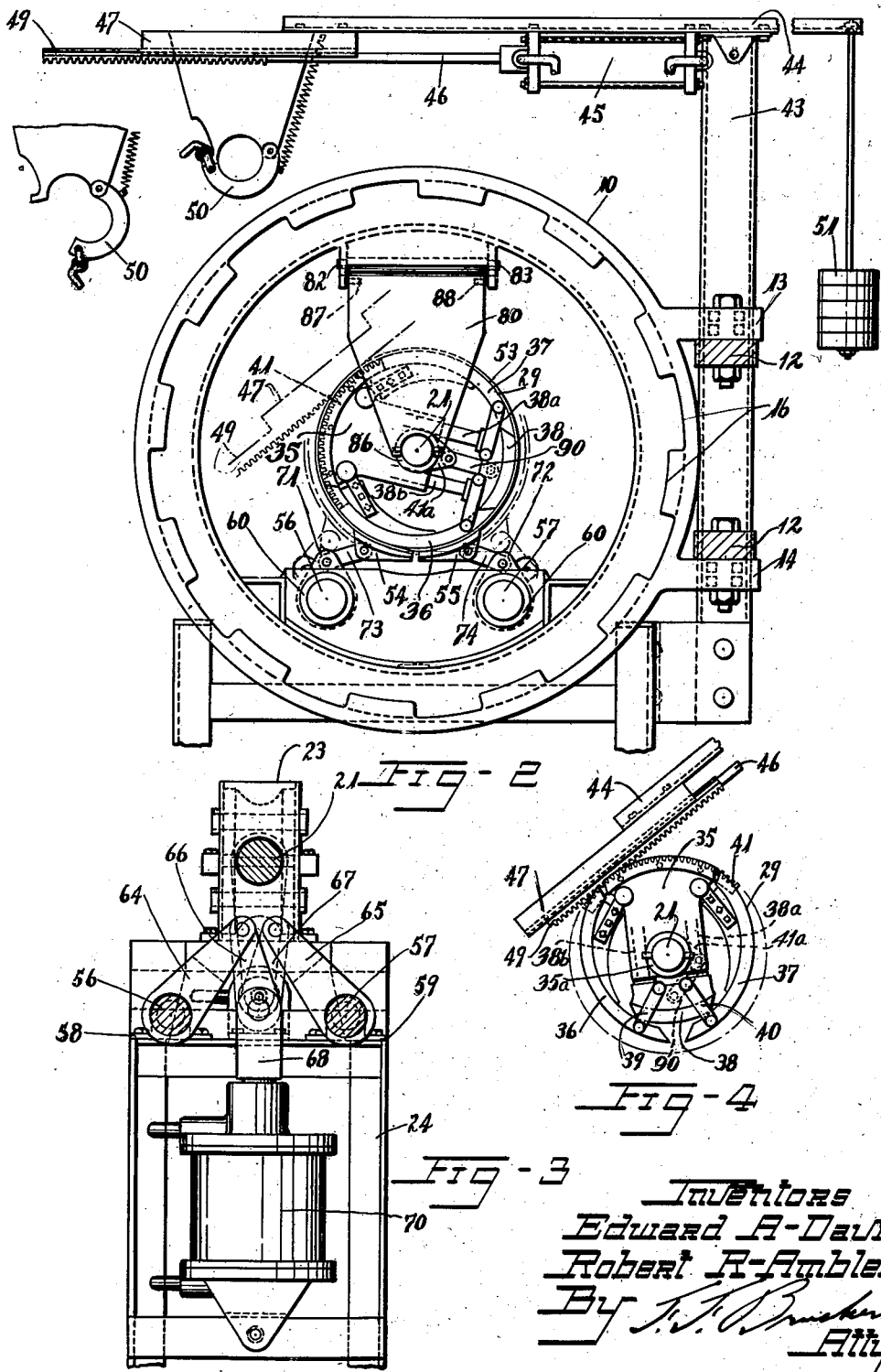

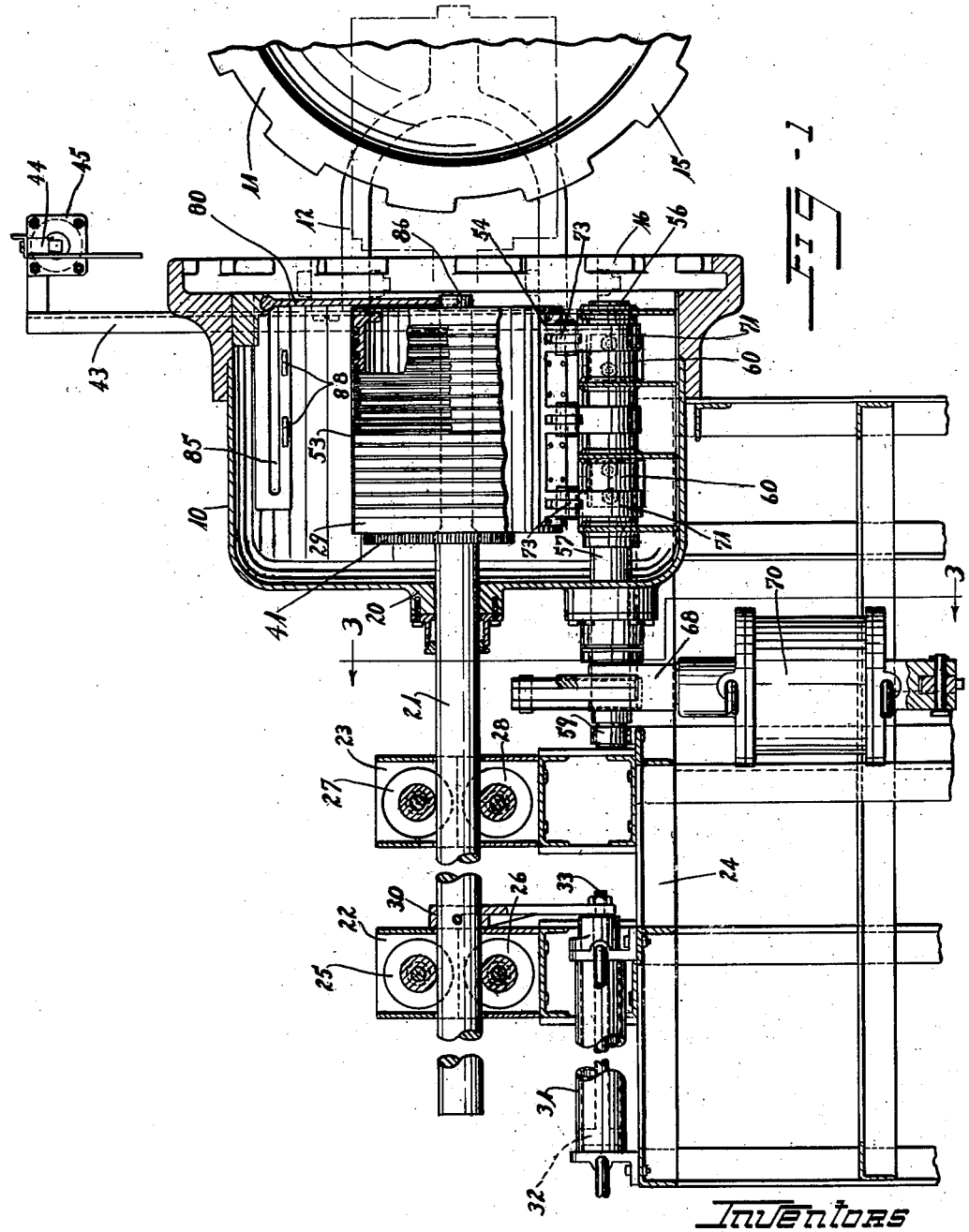

Patented Feb. 26, 1952

2,587,119

UNITED STATES PATENT OFFICE 2,587,119

APPARATUS FOR VULCANIZING ANNULAR ARTICLES

Edward A. Davis and Robert R. Ambler, Akron, Ohio, assignors to The B. F. Goodrich Company, New York, N. Y., a corporation of New York Application August 6, 1946, Serial No. 688,600

15 Claims. (Cl. 18—6)

This invention relates to apparatus for vulcanizing annular articles and is especially useful for vulcanizing endless V-belts.

In the manufacture of endless V-belts especially where such belts are to be used in sets of parallel running belts, it has been found desirable to provide uniformity of length, cross-sectional dimensions, stretchability, flexibility, and strength.

In prior procedures, where such belts have been provided with tension members, such as cords or wire cables, there has been a tendency for the tension members to become displaced when molding pressure has been applied laterally of the belts, especially due to the softening of the rubber-like material about them during the vulcanization of the belts. Such displacement also has resulted in differences in tension of the tension members.

Where the belts have been forced into the grooves by the prior procedure of cross-wrapping with rags, the tension members have also been displaced resulting in shortening of life of the belts as the rag wrapping was free to force the belts below the ribs separating the belt grooves of the drum.

Where such belts have been molded between laterally moveable mold parts, irregularities in width of the belts have sometimes occurred due to incomplete closing of the mold parts. Rapid wear of the mold parts at their meeting surfaces has also resulted in reduction of width of the belts.

The present invention aims to overcome the foregoing and other difficulties by molding endless belts between a drum member and a surrounding sleeve member both of which are supported by but moveable with relation to the vulcanizer and at least one of which is adapted to be expanded and/or contracted toward and away from the other to permit placement and removal of the belts and to apply radially directed molding pressure to the belts throughout the curing thereof, while permitting good circulation of steam about the mold members and controlling mold pressure from without the vulcanizer by power operated means.

An object of the invention is to provide for molding endless belts with a high degree of uniformity in the length, cross-sectional size, flexibility, stretch characteristics and quality of the belts.

A further object is to provide continuous confining pressure about the annular articles during vulcanization. Other objects are to provide for quick assembly and disassembly of the apparatus for the transfer of the belts thereto and therefrom, to provide for mechanical support of the mold at all times, and to provide for controlled power movement of the mold into and out of the vulcanizer.

These and other objects will appear from the following description and the accompanying drawings.

Of the drawings,

Fig. 1 is a sectional view of apparatus constructed in accordance with and embodying the invention, parts being broken away.

Fig. 2 is an end view thereof with the door of the vulcanizer removed.

Fig. 3 is a sectional view taken on line 3—3 of Fig. 1.

Fig. 4 is a detail view of the inner mold member and the means for collapsing and expanding it.

Referring to the drawings, the numeral 10 designates a horizontal open steam vulcanizer. A lid 11 therefor is rotatably mounted on an arm 12 having hinge connections 13, 14 to the vulcanizer. The lid and the vulcanizer have intercalated lugs 15, 16 which provide for locking the lid by slight rotation thereof, and the usual sealing gasket is provided for sealing the vulcanizer.

The rear wall of the vulcanizer has a central stuffing box 20, through which a shaft 21 is slideably mounted. Pedestals 22, 23 are fixed to a frame 24 which supports the vulcanizer and have grooved guide rollers 25, 26, 27, 28 rotatably journaled thereon for guiding the shaft 21 axially. A molding drum 29 is fixed to shaft 21 as is also an arm 30. This drum may be of solid construction where the inner face of the belts are flat. Where the drum is of grooved construction, as shown, means are provided for expanding and collapsing it to permit placement and removal of the belts.

For moving the drum into and out of the vulcanizer, a double-acting fluid pressure operated cylinder 31 is fixed to frame 24. It has a piston 32 connected to arm 30 by a piston rod 33. The arrangement is such that by movement of the piston 32, the drum may be moved axially into or out of the vulcanizer for loading purposes, and the drum is closely associated with the vulcanizer so that good circulation of steam thereabout is provided.

The grooved drum is collapsible for mounting belts in its grooves and removing the belts or other annular articles therefrom and also for tensioning the belts and pressing them against the confining sleeve. Such collapsible drums are commonly employed in band or drum type tire building operations and any known form of collapsing and expanding mechanism may be used for manipulating the drum. In the illustrated form, the drum comprises a fixed segment 35 rotatably mounted about shaft 21, the segment 35 being provided with a hub 35a rotatably engaging the shaft for this purpose. Wing segments 36, 37 of the drum are hinged to fixed segment 35, and a key segment 38 is slideably mounted on the fixed segment for radial movement relative thereto, as by guide pins 38a, 38b fixed to segment 38 and having sliding engagement with the segment 35 which has guideways for receiving them. The wing segments are also pivotally connected to the key segment by links 39, 40. A segmental gear 41 is fixed to drum segment 35 which is journaled on shaft 21. Means is provided for moving the wedge segment 38 radially of shaft 21, and for this purpose, a crank arm 41a is secured to shaft 21 and is pivotally connected to segment 38 by a link 90. The arrangement is such that when fixed segment 35 is rotated about non-rotatable shaft 21 by gear segment 41 attached thereto from the position of the parts shown in Fig. 2 to the position of Fig. 4, or vice versa, crank arm 41a fixed to shaft 21 actuates link 90 to move wedge segment 38 radially relative to shaft 21.

For operating the drum with minimum manual effort, a pedestal 43, fixed to the frame 24, has an arm 44 pivoted thereon. Arm 44 supports a double-acting fluid pressure-operated cylinder 45 and a guideway 47 fixed thereto. A piston in cylinder 45 is fixed to a piston rod 46 which carries a rack bar 49 guided for sliding movement along the guideway 47. A snap bearing 50 is fixed to the guide 47 in a position to engage about shaft 21. When engaged with the shaft, with the drum 29 in its outer position, the rack bar 49 meshes with gear 41 and may be employed to collapse or reassemble the drum 29. A weight 51 acts as a counter-balance to hold arm 44 normally in a horizontal position. As the drum is peripherally grooved to receive the belts, and the belts are inextensible, the drum is collapsed to pass the belts thereover.

For enclosing the belts and constantly pressing them against the drum during vulcanization, a contractible sleeve 53, which is retained in the vulcanizer, preferably has a flexible face of sheet metal which has ears 54, 55 secured thereto near its overlapping ends. While the face of the sleeve is shown as of smooth contour, it may be circumferentially grooved to form the outer faces of the belts. A pair of parallel shafts 56, 57 rotatably extend through stuffing boxes in the rear wall of the vulcanizer and are journaled in bearings 58, 59 on frame 24 and also in bearings 60, 60 fixed within the vulcanizer. Crank arms 64, 65 fixed to shafts 56, 57 respectively are connected by links 66, 67 to a piston rod 68 connected to the piston of a double-acting pressure-fluid operated cylinder 70 secured to frame 24. Crank arms 71, 71, 72, 72 also fixed to shafts 56, 57 respectively, are connected to ears 54, 55 respectively by links 73, 73, 74, 74. The arrangement is such that as piston rod 68 is raised, the ends of the band 53 are spread apart to permit clearing the drum, and as piston rod 68 is lowered, the ends of the band are drawn about the drum.

Pressure operating fluid, such as compressed air, is arranged to be supplied to opposite ends of cylinders 31, 45 and 70 through suitable control valves (not shown) from any convenient source of pressure fluid.

To provide for steadying the drum 29 and shaft 21 against the clamping force, an arm 80 is hingedly mounted to the vulcanizer with its pintles 82, 83 slideably mounted in L-shaped slots such as 85. The arm 80 has a snap bearing 86 at its lower end adapted to engage about the end of shaft 21 when the drum is within the vulcanizer. When the vulcanizer is opened, the arm is swung outwardly and upwardly and may then be slid along the slots until it rests upon stop pins 87, 88 for holding it out of the way of the drum.

The operation of the apparatus is as follows:

The vulcanizer door is opened, the arm 80 is released from shaft 21 and swung to its upper position. Fluid under pressure is introduced into the upper end of cylinder 70 to release the tension on band 53. Then fluid under pressure is admitted to the left end of cylinder 31, as seen in Fig. 1, to advance the drum from the vulcanizer.

With the drum in its advanced position, arm 44 is lowered about its pivot and bearing 50 is engaged about shaft 31. Fluid under pressure is then admitted to the left end of cylinder 45, as seen in Fig. 2, retracting rack 49 which turns gear 41 to collapse drum 29. The mold is now ready to receive the belts which are placed about the drum and in the grooves therein where such grooves are employed.

Fluid pressure to cylinder 45 is now reversed by exhausting the left end thereof and applying pressure to the right end thereof and the drum is expanded to normal size. Bearing 50 is released from shaft 31 and arm 44 is raised. Then fluid pressure to cylinder 31 is reversed to move the drum into the vulcanizer and within the band 53. The arm 80 is lowered and its bearing 86 engaged with shaft 21. Fluid is then exhausted from the lower end of cylinder 70 and applied to the upper end thereof resulting in clamping of the band 53 about the drum 29. The door of the vulcanizer is then closed and steam is admitted to the vulcanizer to cure the belts. As the belts are heated, they soften and may be forced into the grooves by the band as tension is maintained on the band during cure.

The apparatus has the advantage of eliminating all lifting on the part of the operator except in handling the belts. The belts are closely confined in the mold and the confining pressure is continued during vulcanization of the belts.

Variations may be made without departing from the scope of the invention as it is defined by the following claims.

We claim:

1. Apparatus for vulcanizing an annular article, said apparatus comprising a drum for supporting the article thereabout, an open steam vulcanizer arranged to completely confine and support the drum, a contractible split band of substantially inextensible material for pressing the article against the peripheral surface of the drum, said band being mounted within said vulcanizer, and means extending through the wall of said vulcanizer for adjusting tension of the band about the article while the drum is confined within the vulcanizer for vulcanizing the article.

2. Apparatus for vulcanizing an annular article, said apparatus comprising a drum for supporting the article thereabout, an open steam vulcanizer arranged to support and completely confine the drum, means for moving the drum into and out of the vulcanizer, a contractible split band of substantially inextensible material for pressing the article against the peripheral surface of the drum, said band being mounted within said vulcanizer, and means extending through the wall of said vulcanizer for adjusting tension of the band about the article while the drum is confined within the vulcanizer for vulcanizing the article.

3. Apparatus for vulcanizing an annular article, said apparatus comprising a collapsible drum for supporting the article thereabout, an open steam vulcanizer arranged to support and confine the drum, means mounted on the vulcanizer and arranged and adapted to cooperate with said drum to collapse and expand said drum, a contractible band for pressing the article against the peripheral surface of the drum, and means extending through the wall of said vulcanizer for maintaining tension of the band about the article while the drum is confined within the vulcanizer for vulcanizing the article.

4. Apparatus for vulcanizing an annular article, said apparatus comprising a collapsible drum for supporting the article thereabout, an open steam vulcanizer arranged to support and confine the drum, means mounted on the vulcanizer and arranged and adapted to cooperate with said drum to collapse and expand said drum, and means extending through the wall of said vulcanizer for moving said drum into and out of said vulcanizer and into and out of alignment with the collapsing and expanding means.

5. Apparatus for vulcanizing an annular article, said apparatus comprising a collapsible drum for supporting the article thereabout, an open steam vulcanizer arranged to support and confine the drum, means mounted on the vulcanizer to collapse and expand said drum, means extending through the vulcanizer for moving said drum into and out of said vulcanizer, a contractible band for pressing the article against the peripheral surface of the drum, and means extending through the vulcanizer for maintaining tension of the band about the article while the drum is confined within the vulcanizer for vulcanizing the article.

6. Apparatus for vulcanizing an annular article, said apparatus comprising a peripherally grooved collapsible drum for supporting an article thereabout in a groove thereof, an open steam vulcanizer arranged to confine the drum, means mounted on the vulcanizer to collapse and expand said drum, said means being engageable with the drum when the drum is outside the confining vulcanizer, means extending through the vulcanizer for moving said drum into and out of said vulcanizer, a contractible band for pressing the article against the peripheral surface of the drum, and means extending through the vulcanizer for maintaining tension of the band about the article while the drum is confined within the vulcanizer for vulcanizing the article.

7. Apparatus for vulcanizing an annular article, said apparatus comprising an open steam vulcanizer, a shaft arranged axially of said vulcanizer and movable axially thereof, a peripherally grooved collapsible drum mounted on said shaft for supporting an article thereabout in a groove thereof, means for moving said shaft to transport the drum into and out of said vulcanizer, means mounted on said vulcanizer and engageable with said drum when said drum is in its outermost position to collapse and expand said drum, a contractible band supported within said vulcanizer, and means extending through a wall of said vulcanizer to contract said band about the article on said drum when said drum is within said vulcanizer, said last named means being adapted to maintain confining pressure of said band about said article during vulcanization of said article.

8. Apparatus for simultaneously vulcanizing a group of endless V-belts having tension resisting reinforcements therein, said apparatus comprising a collapsible drum having peripheral grooves for individually receiving belts of the group, an open steam vulcanizer for closely confining the drum, means on said vulcanizer for moving the drum into and out of the vulcanizer, a contractible band for pressing the belts into the grooves of said drum, said band being mounted within said vulcanizer, means on said vulcanizer for collapsing and expanding said drum, and means on said vulcanizer for contracting and expanding said band.

9. Apparatus for simultaneously vulcanizing a group of endless V-belts having tension-resisting reinforcements therein, said apparatus comprising a collapsible drum having peripheral grooves for individually receiving belts of the group, an open steam vulcanizer for closely confining the drum, power operated means on said vulcanizer for moving the drum axially into and out of the vulcanizer, a contractible band for pressing the belts into the grooves of said drum, said band being mounted within said vulcanizer, power-operated means on said vulcanizer for collapsing and expanding said drum, and power operated means on said vulcanizer for expanding and contracting said band about said drum.

10. Apparatus for vulcanizing an annular article, said apparatus comprising a drum arranged for supporting an article about its periphery, a vulcanizer arranged to confine and support said drum, a band supported within said vulcanizer for confining the outer periphery of the annular article, means extending through a wall of said vulcanizer for moving said drum axially into and out of confining relation with said band, and means on said vulcanizer controlling at least one of said drum and said band for individualy applying molding pressure therebetween against said article.

11. Apparatus for simultaneously vulcanizing a group of endless V-belts having tension-resisting reinforcements therein, said apparatus comprising a peripherally grooved drum arranged to support a plurality of belts about its periphery, a vulcanizer arranged to confine and support said drum, a band supported within said vulcanizer for confining the outer peripheries of said belts, means extending through a wall of said vulcanizer to move said drum axially into and out of confining relation with said band, and means on said vulcanizer controlling at least one of said drum and said band for radially applying molding pressure therebetween against said belts.

12. Apparatus for simultaneously vulcanizing a group of endless V-belts having tension-resisting reinforcements therein, said apparatus comprising a peripherally grooved drum arranged to support a plurality of belts about its periphery, a vulcanizer arranged to confine and support said drum, a band supported within said vulcanizer for confining the outer peripheries of said belts, means extending through a wall of said vulvanizer to move said drum axially into and out of confining relation with said band and means on said vulcanizer controlling said band for radially applying molding pressure between said drum and said band against said belts.

13. Apparatus for simultaneously vulcanizing a group of endless V-belts having tension resisting reinforcements therein, said apparatus comprising a peripherally grooved drum arranged to support a plurality of belts in axially spaced apart relation thereon, a vulcanizer arranged to confine and support said drum, a contractible band supported within said vulcanizer for confining said belts in the grooves of said drum, means on said vulcanizer for moving said drum into and out of said vulcanizer, means engageable with said drum at its outermost position for collapsing it to remove and place belts thereon, and means on said vulcanizer for contracting said band about said drum.

14. Apparatus for molding endless V-belts, said apparatus comprising a collapsible drum having a series of peripheral belt-molding grooves with inwardly converging side-molding faces at its outer face for molding the side faces of V-belts, and having complemental segments of its grooved peripheral portion hinged to each other, a supporting hub mounted on a segment, means including a shaft for engaging said hub to support the drum, and power-operated means engageable with said drum for forcing said segments from a collapsed belt-receiving position to an annular belt-molding position while conforming belt articles to said grooves.

15. Apparatus for mounting endless V-belts peripherally of a molding drum, said apparatus comprising a molding drum having a series of peripheral belt-molding grooves with inwardly converging side-molding faces, said drum including complemental grooved drum segments hinged to each other for collapse from the full-periphery condition, one of said drum segments having a supporting hub portion, a support, a shaft on said support for engaging said hub portion of the drum, rotatable means mounted on said drum for rotative movement with respect to said shaft, and power operated means engageable with said rotatable means for rotating said rotatable means to adjust said drum portions to and from a collapsed belt-receiving position and a belt-molding position and to form belt articles to conform to said grooves.

EDWARD A. DAVIS.
ROBERT R. AMBLER.

REFERENCES CITED

The following references are of record in the file of this patent:

UNITED STATES PATENTS

| Number | Name | Date |
|---|---|---|
| 759,196 | Shaw | May 3, 1904 |
| 905,305 | Gage | Dec. 1, 1908 |
| 1,022,970 | Ott | Apr. 9, 1912 |
| 1,509,380 | Talalay | Sept. 23, 1924 |
| 1,729,329 | Chilton | Sept. 24, 1929 |
| 1,948,491 | Brockway | Feb. 27, 1934 |
| 2,172,111 | Schick | Sept. 5, 1939 |
| 2,253,792 | Leavenworth | Aug. 26, 1941 |
| 2,254,415 | Boyd et al. | Sept. 2, 1941 |